United States Patent [19]
Nicholson

[11] Patent Number: 5,230,004
[45] Date of Patent: Jul. 20, 1993

[54] NARROW BEAM OSCILLATOR AND LARGE VOLUME AMPLIFIER UTILIZING SAME GAIN MEDIUM

[75] Inventor: Peter Nicholson, Long Island City, N.Y.

[73] Assignee: Holographics Inc., Long Island City, N.Y.

[21] Appl. No.: 825,980

[22] Filed: Jan. 27, 1992

[51] Int. Cl.$^5$ .............................................. H01S 3/08
[52] U.S. Cl. ...................... 372/92; 372/27; 372/29; 372/32; 372/28; 372/93; 372/94; 372/108
[58] Field of Search ...................... 372/27, 26, 20, 108, 372/92, 28, 29, 32, 93, 94

[56] References Cited

U.S. PATENT DOCUMENTS

| | | | |
|---|---|---|---|
| 4,305,046 | 12/1981 | Le Floch et al. | 372/27 |
| 4,975,918 | 12/1990 | Morton | 372/20 |
| 5,127,019 | 6/1992 | Epstein et al. | 372/108 |
| 5,142,548 | 8/1992 | Krasinski et al. | 372/20 |

OTHER PUBLICATIONS

A New Design for Solid-State Lasers, Itamar Shoshan and Haim EL-OP, Electro-Optics Industries, French-Israeli Workshop on Solid State Lasers, Proc. SPIE vol. 1182, 115, 118, pp. 545-548, 1988.

Primary Examiner—Georgia Y. Epps
Attorney, Agent, or Firm—Brumbaugh, Graves, Donohue & Raymond

[57] ABSTRACT

A solid-state laser oscillator/amplifier system, which combines in a single laser crystal the operations of a narrow beam oscillator and a large volume amplifier, utilizes the polarization feature of the laser beam to effect coupling of an amplified beam out of the resonator in a manner which efficiently utilizes the whole volume of the active medium. The system generates a high brightness laser beam with high output energy contained in a small divergence angle.

6 Claims, 1 Drawing Sheet

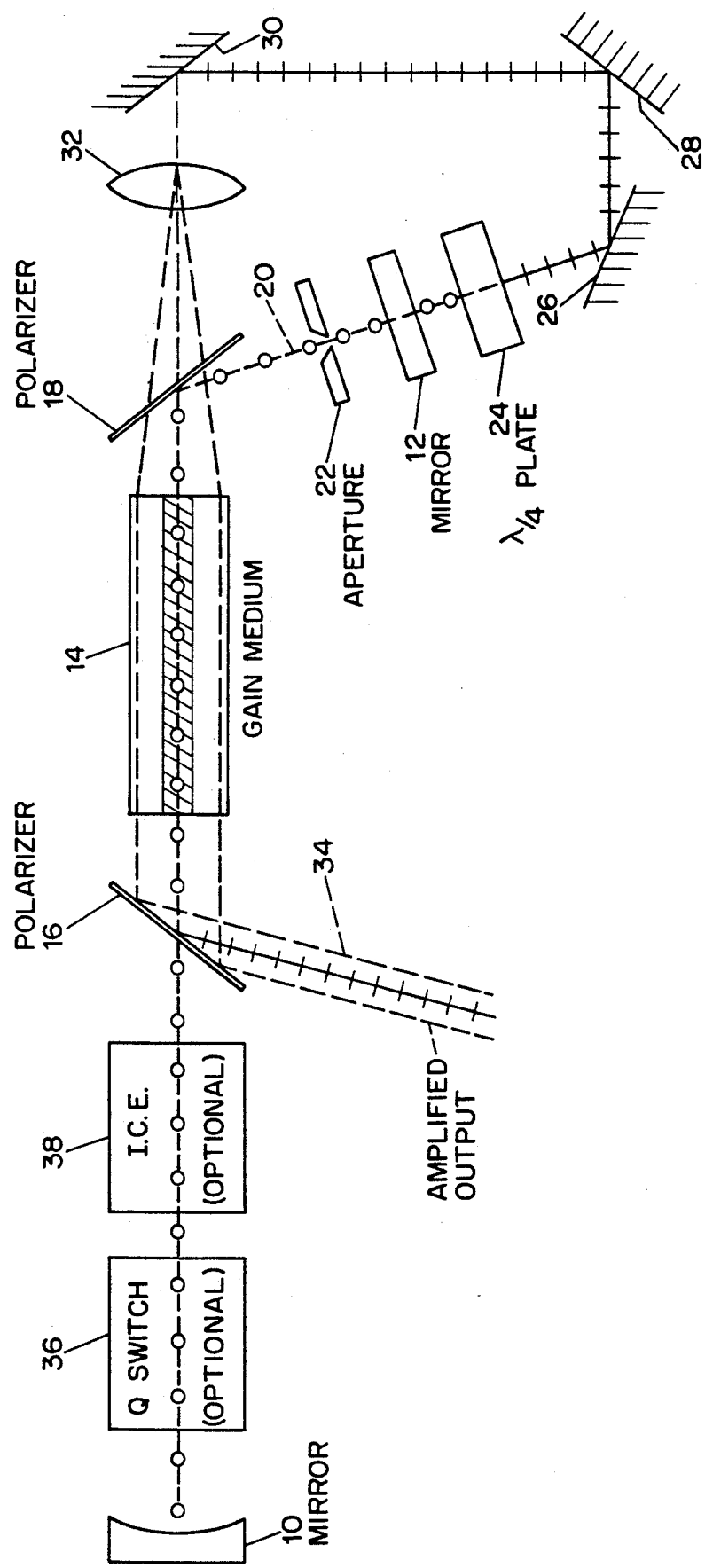

NARROW BEAM OSCILLATOR AND LARGE VOLUME AMPLIFIER UTILIZING SAME GAIN MEDIUM

BACKGROUND OF THE INVENTION

This invention relates generally to solid-state lasers and, more particularly to apparatus which combines in a common gain medium the operations of producing a $TEM_{oo}$ laser beam and amplifying the beam.

A laser usually includes an active medium located within an optical resonator. In a stable laser resonator, conventionally used to achieve a $TEM_{oo}$ beam profile, it is usual to introduce an aperture to narrow the oscillator beam so that only a transverse mode can emerge. However, such aperturing of the oscillator beam is very costly in terms of lost energy. Typically, a laser oscillator using a 6.35 mm diameter by 4 inches long ruby crystal may produce one joule of energy when operating multimode open aperture, but when the beam is apertured with a 1.75 mm aperture in order to produce a $TEM_{oo}$ output, only about 80 millijoules of energy is produced. This difference in energy is stored in the crystal and is wasted.

It is a primary object of the present invention to provide a resonator configuration which combines in a single laser crystal the operations of a narrow beam oscillator and a large volume amplifier.

SUMMARY OF THE INVENTION

Briefly, this object is achieved by a novel resonator configuration which combines in a single laser crystal the operations of a narrow beam oscillator and a large volume amplifier. The resonator is a stable resonator in which two mirrors may be used as the terminal reflectors, and the gain medium is an optically-pumped non-polarizing crystal, such as Nd:YAG or Alexanderite, in the form of a cylindrical rod. Two polarizers are positioned within the resonator, one between a first terminal reflector having 100% reflectivity and a first end of the crystal rod and oriented to transmit an incident beam which has a first polarization and to reflect an incident beam which has a polarization orthogonal to the first, and the other between the other end of the crystal rod and the second terminal reflector, which is partially transmissive, and oriented to reflect an incident beam which has said first polarization and to transmit an incident beam which has said second polarization. An intracavity aperture limits the diameter of the beam so that only the central region of the active medium is utilized by the intracavity beam. The oscillator beam outcoupled from the partially transmissive reflector is passed through a halfwave plate, which rotates its polarization by 90°, then broadened with a diverging lens to a diameter which matches the diameter of the laser crystal, and directed back into the crystal rod for amplification in a single un-apertured pass therethrough. An amplified output beam is extracted from the resonator by reflection from the first polarizer.

BRIEF DESCRIPTION OF THE DRAWING

Other objects, features and advantages of the invention will become apparent, and its construction and operation better understood, from the following detailed description, read in conjunction with the accompanying drawing the single figure of which is a schematic diagram of the compound oscillator-amplifier laser according to the invention.

DETAILED DESCRIPTION OF THE PREFERRED EMBODIMENT

Referring to the drawing, the terminal reflectors of the resonator comprise a first 100% reflective cylindrical mirror 10 and a second partially transmissive planar mirror 12 typically having a reflectivity in the range from 30% to 80%. The active gain medium is an optically pumped non-polarizing crystal, such as Neo:YAG or Alexanderite, in the form of a cylindrical rod 14. Two thin film polarizers 16 and 18, also known as plate polarizers, each having a multi-layer dielectric coating, every interface of which reflects a percentage of the S and transmits the P planes of polarization so that as light passes through the resonant coatings stack it becomes progressively polarized, are included within the optical resonator: polarizer 16 is set at Brewster's angle and is positioned between mirror 10 and the left-hand end of crystal 14 (as viewed in the drawing) and is oriented to transmit an incident beam which has a first polarization, for example, S-polarization represented by the small circles distributed along the optical axis of the system, and to reflect an incident beam which has an orthogonal polarization, P-polarization in this example, represented by short lines distributed along the optical axis, and polarizer 18 is set at Brewster's angle and positioned between the right-hand end of crystal 14 and mirror 12 and is oriented to reflect an incident beam which has said first or S-polarization and to transmit an incident beam which has said second or P-polarization. Polarizer 18 reflects the intracavity S-polarized beam along a second optical axis 20, which is angularly displaced from the optical axis of the gain medium, through an intracavity aperture 22 and onto mirror 12. The aperture 22 determines the diameter of the narrow beam traveling along the laser crystal 14; as indicated by the cross-hatching, only the central region of the active medium is utilized by the intracavity beam.

The laser output beam is outcoupled by the partially transmissive terminal reflector 12, with the indicated S-polarization, and transmitted through a halfwave plate 24 which rotates the polarization by 90°, that is, from S-polarization to P-polarization, indicated by the short transverse lines. The P-polarized beam is reflected by an arrangement of mirrors 26, 28 and 30 onto a diverging lens 32 for expanding the oscillator output beam to a diameter which matches the diameter of the laser crystal 14 so as to extract energy from the external region of the rod which is not utilized by the narrow intracavity beam. After amplification the expanded beam, because it is P-polarized, is reflected out of the laser by polarizer 16 to provide an amplified output beam 34.

Since the whole volume of the laser crystal is utilized, a small central region by the intracavity beam, and the larger external region by the expanded oscillator output beam, the efficiency of the laser is enhanced, and by using a large crystal a high output energy is obtained. By suitable choice of diameter for aperture 22, the lasing action of the oscillator is limited to a few, if any, low-order transverse modes, thereby to obtain a $TEM_{oo}$ laser beam with low beam divergence and good beam quality.

It is important that the optical components of the described system be arranged to eliminate, to the extent possible, feedback, parasitic oscillations or prelasing caused by reflections from the end faces of the gain medium. If necessary, such problems can be obviated by employment of one or more known methods, including the insertion of a Q-switch 36 and/or an I.C.E. 38.

While a specific embodiment has been described it will now be evident to one skilled in the art that changes may be made without departing from the general principles and scope of the invention, which is defined in the appended claims.

I claim:

1. Laser apparatus utilizing the same gain medium for oscillation and amplification comprising:
   (a) a resonator defined by a first totally reflecting terminal reflector and a second partially transmissive terminal reflector;
   (b) an optically-pumped cylindrical crystal rod disposed within said resonator with its optical axis coincident with a first axis of said resonator;
   (c) a first polarizer positioned on the optical axis of said crystal rod between said first terminal reflector and a first end of said crystal rod and oriented to transmit an incident light beam having a first polarization and to reflect an incident beam having a second polarization orthogonal to said first polarization;
   (d) a second polarizer positioned on the optical axis of said crystal rod at the end of said rod opposite said first end and oriented to reflect along a second axis an incident beam having said first polarization and to transmit an incident beam having said second polarization, said second partially transmissive terminal reflector being positioned on said second axis;
   (e) an aperture positioned on said second axis between said second polarizer and said second terminal reflector for limiting the diameter of the intracavity beam so as to utilize only the central region of said crystal rod;
   (f) means positioned on said second axis outside said resonator for rotating said first polarization of the beam outcoupled from said resonator and producing a rotated output beam having polarization which is orthogonal to said first polarization; and
   (g) means for broadening said rotated beam to have a diameter which substantially matches the diameter of said crystal rod and directing said broadened beam back into said opposite end of said crystal rod for amplification in a single pass therethrough to obtain an amplified beam which is extracted from said resonator by reflection from said first polarizer.

2. Apparatus in accordance with claim 1, wherein said means (f) for rotating said first polarization of the outcoupled beam is a halfwave plate.

3. Apparatus in accordance with claim 1, wherein said means (g) for broadening said rotated output beam is a diverging lens positioned outside said resonator on an extension of the optical axis of said laser rod.

4. Apparatus in accordance with claim 3, wherein said means (g) further comprises a plurality of reflective surfaces angled relative to each other so as to direct said rotated output beam through said diverging lens and into said crystal rod.

5. Apparatus in accordance with claim 1, wherein said means (f) for rotating said first polarization of the outcoupled beam is a halfwave plate, and
   wherein said means (g) for broadening said rotated output beam is a diverging lens positioned outside said resonator on an extension of the optical axis of said laser rod.

6. Apparatus in accordance with claim 5, wherein said means (g) further comprises a plurality of reflective surfaces angled relative to each other so as to direct said rotated output beam through said diverging lens and into said crystal rod.

* * * * *